Aug. 8, 1944.        W. E. MOORE        2,355,095
METALLURGICAL APPARATUS
Filed Aug. 16, 1943
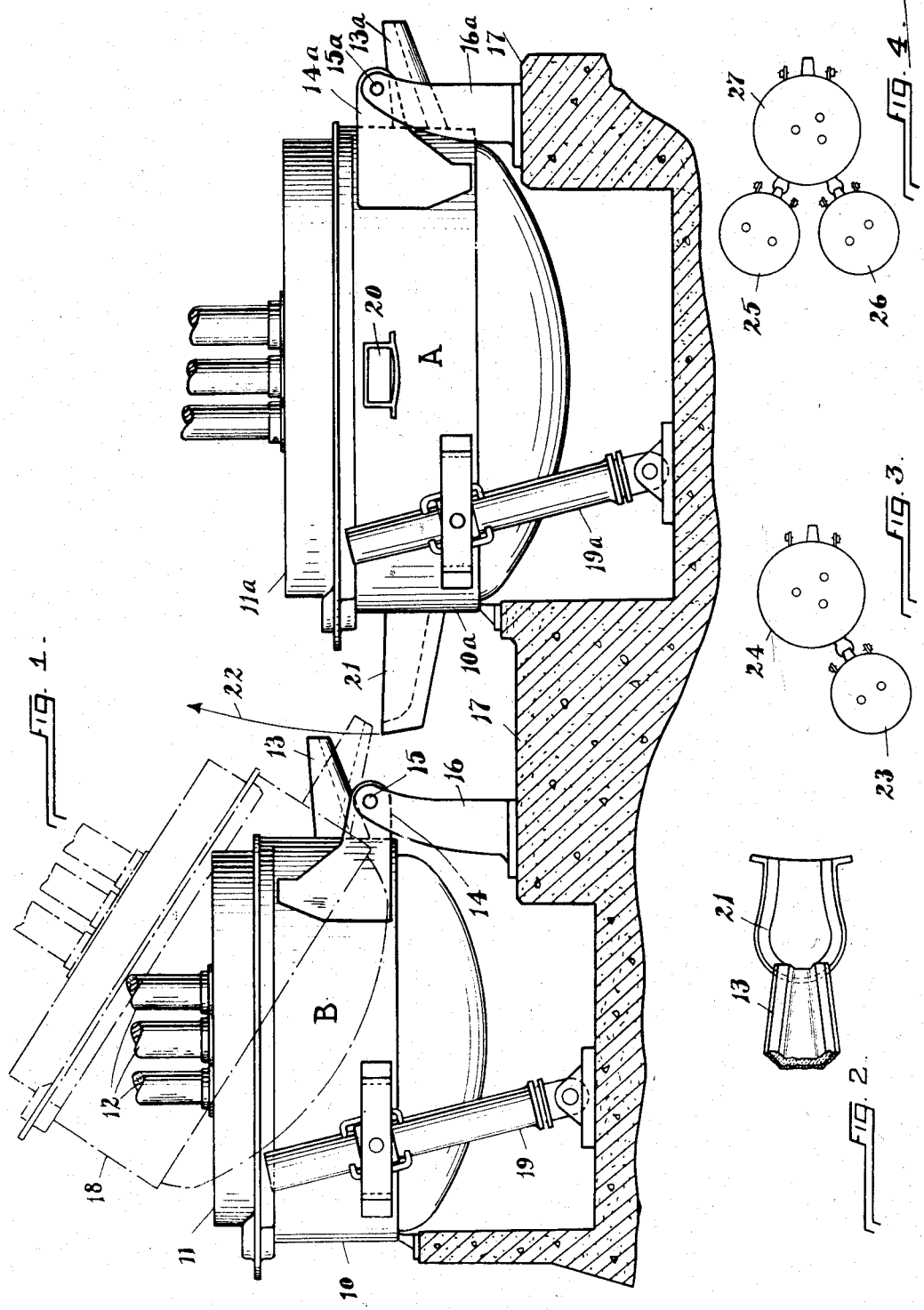
INVENTOR
William E. Moore
BY
Christy, Parmelee and Strickland
ATTORNEYS Patented Aug. 8, 1944

2,355,095

UNITED STATES PATENT OFFICE 2,355,095

METALLURGICAL APPARATUS

William E. Moore, Pittsburgh, Pa.

Application August 16, 1943, Serial No. 498,751

4 Claims. (Cl. 13—10)

This invention relates in general to metallurgical apparatus, and is particularly applicable to the structure and arrangement of electric furnaces in connection with which it will be described, although it is to be understood that it is also applicable to other metallurgical units than electric furnaces.

More particularly, the invention is directed to certain improvements in the structure and organization of electric furnaces in battery installations, that is, installations that comprise a holding furnace in which molten metal is refined or rendered homogeneous and one or more melting furnaces that supply the holding furnace.

In melting and refining metal by the use of electric furnaces there are certain situations where it is desirable to employ multi-stage operation, sometimes termed "duplexing." This method requires the use of a holding furnace and at least one melting furnace, with the melting furnace located adjacent to the holding furnace, and arranged to allow direct pouring of molten metal from the melting furnace into the holding furnace. From the holding or receiving furnace the metal from time to time is teemed into a suitable receptacle.

By virtue of the improvements of my invention, an operator may melt down the charge in one furnace, for example an acid furnace, and pour the melt directly into another furnace, for example a basic furnace, where the metal may be refined and held until needed. The melting furnace may conveniently be a high speed heavy demand electric furnace which may be operated at convenient intervals. Such a furnace could well be a 3000 k. w. furnace of say 6 tons capacity. The holding or refining furnace may conveniently be a 500 k. w. low demand furnace of say 10 tons capacity—a furnace which is decidedly cheaper to operate than the aforesaid melting furnace.

The melting furnace is arranged closely adjacent to the refining furnace and in such position that the contents of the melting furnace can be poured directly into the holding furnace, without intermediate handling of the metal.

The drawing shows an exemplary embodiment of my invention. In the drawing, which is largely diagrammatic;

Figure 1 is a view in side elevation of appropriate apparatus,

Figure 2 is a plan view of a detail of the pouring spout and the receiving spout, Figure 3 is a plan view of another furnace arrangement, and Figure 4 is a plan view of still another furnace arrangement.

In the drawing, Figure 1 shows a multi-stage metal-refining unit, including two electric furnaces generally designated A and B respectively. The furnaces are each of conventional design and are arranged one behind the other. Both furnaces are preferably of the nose-tilt type such as is shown and described in Moore, United States Letters Patent No. 2,261,567.

The melting furnace B is preferably an arc furnace of the top charge type, and includes a metal shelled crucible 10, a removable roof 11 through which the electrodes 12 pass into the furnace crucible, and a pouring or discharge spout 13. The discharge spout, which is in communication with the interior of the furnace, projects from the front of the furnace and is centrally disposed between two spaced metal brackets 14, each of which is rigidly secured to the furnace shell. The outer ends of the brackets 14 are pivoted by means of alined bearing pins 15 to the upper ends of spaced apart supporting metal brackets 16, which rest on a foundation 17, whose upper horizontal surface may be understood to form the work floor of the shop in which the installation is operated. The furnace may be tilted around the bearing pins 15 to the pouring position shown in broken lines and designated by the numeral 18, by means of a pair of hydraulic jacks 19, arranged symmetrically on each side of the furnace and to the rear of the center line. A suitable jack arrangement for this purpose is illustrated and described in my co-pending application for United States Letters Patent Serial No. 414,661, filed October 11, 1941, entitled Furnace tilting device.

The holding furnace A is generally similar to furnace B and similar parts bear the same reference numerals, but with the letter "a" affixed to each. The roof 11a may be fixed to the furnace body, as I prefer to use a side charge type of furnace, through the door 20 of which, charge-modifying materials, such as various alloying metals, may be introduced to the burden. The furnace A also has a receiving spout 21, bell-shaped as shown in Figure 2, which projects rearwardly from the furnace and diametrically opposite the pouring spout.

In the arrangement illustrated in Figure 1, the longitudinal axes of the furnace are in line. By the longitudinal axis of a furnace I mean the axis passing through the center of the furnace and at right angles to the alined axes of the pivot pins 15.

Turning to a consideration of the features in which my invention is centered, it will be noted that the two tilting furnaces A and B, arranged in tandem, have their pivot points 15 and 15a located above the work floor (17) of the shop. Indeed, in this case the two pivot points are at the same absolute elevation. The pivot point 15a of the first furnace is located above the pouring spout 13a at the front end of the first furnace is located above the pouring spout 13a at the front end of the first furnace A, whereby the center of gravity of the furnace is below the pivot point. The second furnace B has its pivot point 15 located below the pouring spout 13 at the front end of the furnace, whereby the second furnace stands at higher elevation than the first furnace, this without the necessity of providing a two-story shop building. Due to the particular organization described, the pouring spout 13 of the second furnace, normally standing clear of the receiving spout 21 of the first furnace, is, by the elevation of the rear end of said second furnace, caused to move closer to the first furnace and into pouring position over the rearwardly extending receiving spout 21 thereof. When the furnace A is being tilted to discharge its burden, the end of the receiving spout 21 follows the curved arrow 22, and just clears the end of pouring spout 13, the furnace B then being in level or melting position.

I also contemplate arranging the furnaces so that the longitudinal axis of one is angularly disposed to the longitudinal axis of the other. Such an arrangement is shown in Figure 3, the melting furnace bearing the numeral 23 and the holding furnace bearing the numeral 24.

The apparatus has been described as including two nose-tilting electric furnaces of the arc type, but other types of furnaces can be employed and other tilting mechanism. In Figure 4, there is shown a unit which includes three furnaces, two melting furnaces 25 and 26 and one holding furnace 27. No matter what arrangement of furnaces comprises the unit or battery, it is essential that the melting furnace or furnaces be disposed so that the contents thereof can be discharged directly into the holding furnace.

In practice the charge is melted, usually rapidly, in the melting furnace and then poured directly, by tilting, into the adjoining holding or receiving furnace. The molten metal can be further treated or alloyed in the holding furnace, and held as long as desirable by the application of relatively small power to the furnace electrodes, and then poured as desired in large or small quantities. Such an operation is conducive to low costs and produces a superior and more uniform product.

My invention provides a simple, compact and economical unit for melting and refining or treating metal. The unit is self contained and does not require the more elaborate constructions heretofore employed in such installations. The metal may be melted (a high power-consuming operation) at an opportune time of low power rates, as at night, and then poured into the refining or holding furnace for further refining and treating (a low power consuming operation) at a lower power cost, whether at high day rates or low night rates, and poured at any convenient time. Marked economies result from this practice.

While I have illustrated and described certain preferred embodiments of my invention it will be understood that the invention is not limited thereto and that various changes in the apparatus and practice may be resorted to without departing from the spirit of the invention or the scope of the following claims.

The application for this patent comprised a continuation-in-part of my application Serial No. 416,528, filed October 25, 1941.

I claim as my invention:

1. A metallurgical apparatus comprising two electric furnaces arranged in tandem, a pouring spout at the forward end of each of said furnaces, and a pivotal support at the forward end of each furnace, the pivot points for both furnaces being above work floor level, with the pivot point for the first furnaces above the level of the spout, whereby the center of gravity of the first furnace is below its pivot point, the second furnace having its pivot point below the spout, whereby the second furnace stands at higher elevation than the first furnace and the pouring spout of the second furnace moves closer to the first furnace when the rear end of said second furnace is elevated, the first furnace having a rearwardly extending spout over which the spout of the second furnace moves when said second furnace is so tilted.

2. A metallurgical apparatus comprising two electric furnaces arranged in tandem, a pouring spout at the forward end of each of said furnaces, and a pivotal support at the forward end of each furnace, the pivot points for both furnaces being at substantially the same absolute elevation, with the pivot point for the first furnaces above the level of the spout, whereby the center of gravity of the first furnace is below its pivot point, the second furnace having its pivot point below the spout, whereby the second furnace stands at higher elevation than the first furnace and the pouring spout of the second furnace moves closer to the first furnace when the rear end of said second furnace is elevated, the first furnace having a rearwardly extending spout over which the spout of the second furnace moves when said second furnace is so tilted.

3. A metallurgical apparatus comprising an electric holding furnace of relatively large capacity and a melting furnace of smaller capacity, the two furnaces being arranged in tandem, a pouring spout at the forward end of each furnace, and a pivotal support at the forward end of each furnace, the pivot points for both furnaces being above work floor level, with the pivot of the holding furnace above the level of its spout, whereby the center of gravity of the holding furnace is below its pivot point, the melting furnace having its pivot point below its spout, with the effect that the melting furnace stands at higher elevation than the holding furnace and the pouring spout of the melting furnace moves closer to the holding furnace when the rear end of said melting furnace is elevated, the holding furnace having a rearwardly extending spout that stands clear of the spout at the forward end of the melting furnace but over which the spout of said melting furnace moves when the melting furnace is tilted as said.

4. A metallurgical apparatus comprising an electric holding furnace of relatively large capacity and a melting furnace of smaller capacity, the two furnaces being arranged in tandem, a pouring spout at the forward end of each furnace, and a pivotal support at the forward end of each furnace, the pivot points for both furnaces being above work floor level and at substantially the same absolute elevation, with the pivot of the holding furnace above the level of its spout, whereby the center of gravity of the holding furnace is below its pivot point, the melting furnace having its pivot point below its spout, with the effect that the melting furnace stands at higher elevation than the holding furnace and the pouring spout of the melting furnace moves closer to the holding furnace when the rear end of said melting furnace is elevated, the holding furnace having a rearwardly extending spout that stands clear of the spout at the forward end of the melting furnace but over which the spout of said melting furnace moves when the melting furnace is tilted as said.

WILLIAM E. MOORE.